(12) United States Patent
Uematsu et al.

(10) Patent No.: US 7,779,105 B2
(45) Date of Patent: Aug. 17, 2010

(54) PARAMETER SETTING/STORING METHOD

(75) Inventors: Michimasa Uematsu, Tokyo (JP); Kaoru Iizuka, Tokyo (JP); Shinji Yamabuchi, Tokyo (JP)

(73) Assignee: Access Co., Ltd., Chiyoda-ku, Tokyo (JP)

( * ) Notice: Subject to any disclaimer, the term of this patent is extended or adjusted under 35 U.S.C. 154(b) by 650 days.

(21) Appl. No.: 11/666,009

(22) PCT Filed: Oct. 21, 2005

(86) PCT No.: PCT/JP2005/019396

§ 371 (c)(1),
(2), (4) Date: Apr. 20, 2007

(87) PCT Pub. No.: WO2006/043664

PCT Pub. Date: Apr. 27, 2006

(65) Prior Publication Data

US 2007/0298773 A1    Dec. 27, 2007

(30) Foreign Application Priority Data

Oct. 22, 2004    (JP)    .............................. 2004-307983

(51) Int. Cl.
*G06F 15/16* (2006.01)
*G06F 12/00* (2006.01)

(52) U.S. Cl. ...................................... 709/223; 709/220

(58) Field of Classification Search ......... 709/220–221, 709/223–229, 217–218
See application file for complete search history.

(56) References Cited

U.S. PATENT DOCUMENTS

| 6,457,030 | B1 | 9/2002 | Adams et al. | |
|---|---|---|---|---|
| 6,601,021 | B2* | 7/2003 | Card et al. | 702/187 |
| 7,536,391 | B2* | 5/2009 | Christian et al. | 707/10 |
| 2002/0007377 | A1 | 1/2002 | Ogishi et al. | |
| 2002/0016789 | A1* | 2/2002 | Ong | 707/10 |
| 2002/0094819 | A1* | 7/2002 | Cao et al. | 455/453 |
| 2002/0103625 | A1* | 8/2002 | Card et al. | 702/187 |
| 2004/0085350 | A1* | 5/2004 | Tachibana et al. | 345/738 |
| 2004/0100507 | A1* | 5/2004 | Hayner et al. | 345/855 |

FOREIGN PATENT DOCUMENTS

| JP | 2002091420 | 3/2002 |
|---|---|---|
| JP | 2002189746 | 7/2002 |
| JP | 2003108424 | 4/2003 |
| WO | WO-03/088083 A1 | 10/2003 |

OTHER PUBLICATIONS

Hayama, H. et al. (Date Unknown). *Can-Do Comprehensive Dictionary: Windows XP Professional & Home Edition* Impress Japan Corporation, pp. 505-517. (English Translation attached, 13 pages).
International Search Report mailed Jan. 31, 2006, for PCT Application No. PCT/JP2005/019396 filed Oct. 21, 2005, 2 pages.
Bos, B. et al. "Cascading Style Sheets, Level 2, CSS2 Specification," located at <http://www.w3.org/tr/rec-css2/> visited on May 12, 1998, pp. 1-11, 21-28, 53-68, 195-236.

(Continued)

*Primary Examiner*—Zarni Maung
(74) *Attorney, Agent, or Firm*—Morrison & Foerster LLP

(57) ABSTRACT

Parameters necessary for browsing of content are stored in storage means while associating the parameters with location information of the content. When location information identical with location information of requested content has been stored in the storage means, parameters that have been stored in the storage means while being associated with the location information identical with the location information of the requested content are acquired from the storage means. When no location information identical with the location information of the requested content has been stored in the storage means, parameters that have been stored in the storage means while being associated with location information satisfying a prescribed rule are acquired from the storage means if such location information satisfying the prescribed rule has been stored in the storage means. The acquired parameters are applied to a process for the browsing of the requested content.

36 Claims, 9 Drawing Sheets

OTHER PUBLICATIONS

Supplementary European Search Report mailed Dec. 12, 2008, for EP Application No. 05795601.3 filed Oct. 21, 2005, 3 pages.

"Apache HTTP Server Version 1.3," (May 12, 2001) *Apache HTTP Server Documentation Project*, <http://httpd.apache.org/docs/1.3/>, pp. 26-28.

Alexander et al. (Sep. 1, 1998). "A Simple Algorithm for the Longest-Prefix-Matching Problem," IP.com Journal, IP.com INC, Henrietta, NY, US.

European Office Action mailed Mar. 8, 2010, for EP Application No. 05795601.3 filed Oct. 21, 2005, 4 pages.

\* cited by examiner

| URL (LOCATION INFORMATION) | PARAMETER DATA | UPDATE TIME | LAST REFERENCE TIME | THE NUMBER OF REFERENCES |
|---|---|---|---|---|
| www.hello.co.jp/news/today | | | | |
| www.access.co.jp/pr | | | | |
| www.sky.com/news/2004 | | | | |
| www.musical.com/rock | | | | |

FIG. 6

| | PARAMETER DATA | | | | |
|---|---|---|---|---|---|
| | Cookie | Acquisition(Loading) of Image Data | Size of Image (Image Size) | Font | ECMAscript |
| www.hello.co.jp/news/today | accept | off | N/A | – | off |
| www.access.co.jp/pr | accept | on | medium | large | on |
| www.sky.com/news/2004 | block | off | N/A | small | off |
| www.musical.com/rock | accept | on | medium | – | on |

DEFAULT

| Imge | Character | ECMAscript | Sound |
|---|---|---|---|
| enable | medium | enable | enable |

PARAMETER MANAGEMENT DB(EXCERPTS)

| URL (Symbole in Fig.9) | Image | Character | ECMAscript | Sound |
|---|---|---|---|---|
| A – 1 | enable | – | – | – |
| A | disable | small | disable | off |
| A – 3 – 1 – 1 | enable | – | disable | on |
| A – 3 | enable | – | disable | off |
| A – 3 – 2 | – | – | – | on |

FIG.11

| Mode \ Parameter | | Font | Table | CSS | ECMA script | Plug In |
|---|---|---|---|---|---|---|
| Standard(0001) | on | medium | on | on | on | on |
| Mobile(0002) | | | | | | |
| Smart Fit(0003) | | | | | | |
| Text(0004) | | | off | off | off | off |

FIG.12

| VALID URL RANGE | SELECTED MODE | INDIVIDUAL SETTING | UPDATE TIME | LAST REFERENCE TIME | THE NUMBER OF REFERENCE |
|---|---|---|---|---|---|
| news.access.co.jp | 0002 | ECMAscript disable | 2004/08/11 | | |
| auctions.access.co.jp/software | 0001 | | | | |
| music.access.co.jp/jazz | 0004 | Sound on | | | |
| | | | | | |

PARAMETER SETTING/STORING METHOD

TECHNICAL FIELD

The present invention relates to the supply of information by a browser, and in particular, to a method for setting and storing parameters which are used when content is browsed by a user.

BACKGROUND OF THE INVENTION

Against the background of the increasing use of the Internet, the browsing of Web pages on the Internet is widely done in recent years. A Web page is made up of text data, layout information by HTML, images, sound and video embedded in the text, etc. When a URL (location information) is designated, a browser as application software for the Web page browsing downloads image files, music files, etc. of a Web page from the Internet, analyzes the layout of the Web page, and displays/reproduces the Web page on the screen of a terminal. The browser generally has a variety of parameters for controlling various steps executed for the acquisition of HTML documents of Web pages (page acquisition process) and for the display/reproduction of Web pages (layout process).

In a non-patent document #1 shown below, it is explained that the user of the browser "Microsoft Internet Explorer" of the Microsoft Corporation can make settings regarding its Web page display operation through the "Internet option" dialog box, etc. For example, the user can make various settings such as customization/alteration of the security level, setting change or restriction level setting regarding cookies, disablement of the reproduction of animation or sound, etc. These settings are made for each window. As for the cookies, the document explains that the browser has been configured so that the user can change the setting regarding the cookies for each Web site by specifying and registering each Web site.

In a technique described in a patent document #1 shown below, the browser display parameters include a parameter "switching of layout rules" and the parameter can be set by a user operation. By setting the parameter, the user can select the optimum display layout in a browser window displayed on the screen of the terminal.

[Non-Patent Document #1]
Hiroshi Hayama, Akihiro Yoshikawa, Seiichiro Matsumura, Minako Toba, Can-do Series Editorial Office "Can-do Comprehensive Dictionary: Windows XP Professional & Home Edition", Impress Japan Corporation

[Patent Document #1]
Japanese Patent Provisional Publication No. 2002-91420

DISCLOSURE OF THE INVENTION

Problems to be Solved by the Invention

The Internet environment of recent years in the advanced information society employs not only PCs but also a wide range of devices like cellular phones and mobile terminal devices (e.g. PDAs). A mobile terminal device generally has a smaller screen size, slower processing speed and smaller memory capacity compared to PCs, and thus the convenience of a mobile terminal device can deteriorate in the browsing of pages. Also with PCs, setting proper display methods each time during the page browsing (in order to quickly acquire necessary information from Web pages) requires the user to perform complicated operations.

Since the setting of parameters necessary for the Web page browsing is made for each window in commonly-used conventional browsers (e.g. Microsoft Internet Explorer), the settings are retained even after shifting to another Web page. For example, when the user has set the character size to "small" in order to acquire more information per screen from the Web page being browsed, the character size setting is retained even after the user has shifted to another Web page by use of a link, search, etc. However, the user after shifting to the next Web page can feel that the changed character size is too small to read the document on the next Web page. In such cases, the user has to perform a complicated operation to reset the character size setting. Meanwhile, the cookie, as one of the parameters, can be set and registered not for each window but for each Web site. However, it is impossible to change the cookie setting for each of different pages in the Web site. Further, the registration of the cookie setting for each Web site requires the user to perform complicated and troublesome operations. For parameters other than the cookie, even the registration for each Web site is impossible (registration for each page is of course also impossible).

In the technique of the patent document #1, when the user moves to another Web page after making the setting of the "switching of layout" parameter on the currently browsed Web page, the setting is reset to a default value. Since the setting is not retained even when the user returns to the Web page on which the setting was made, the user has to perform complicated operations again in order to make the optimum display setting.

The present invention has been made in consideration of the above problems. It is therefore the primary object of the present invention to enhance the usability compared to conventional browser functions by storing the parameter settings necessary for the browsing for each Web page without requiring the user to be particularly conscious of the settings, that is, without the need of complicated operations.

Means for Solving the Problems

In order to achieve the above object, in accordance with an aspect of the present invention, there is provided a parameter setting/storing method comprising the steps of: storing parameters necessary for browsing of content in storage means while associating the parameters with location information of the content; acquiring parameters that have been stored in the storage means while being associated with location information identical with location information of requested content from the storage means when such location information identical with the location information of the requested content has been stored in the storage means, while acquiring parameters that have been stored in the storage means while being associated with location information satisfying a prescribed rule from the storage means when no location information identical with the location information of the requested content has been stored in the storage means and such location information satisfying the prescribed rule has been stored in the storage means; and applying the acquired parameters to a process for the browsing of the requested content.

Therefore, by the present invention, parameters that should be applied to the content (e.g. Web page) to be browsed are automatically acquired from a database (storage means), and thus the user is relieved of the need of performing complicated operations. Further, enhanced usability can be achieved since parameters of similar content can be applied even when the location information of the requested content itself has not been stored in the database.

In the parameter setting/storing method in accordance with the present invention, the location information satisfying the prescribed rule can be location information that is the most similar to the location information of the requested content in regard to both a domain name and a path name among all the location information stored in the storage means.

The parameter setting/storing method in accordance with the present invention may further comprise the steps of: successively comparing each element of the domain name of the location information of the requested content with each element of the domain name of each piece of location information stored in the storage means starting from the rightmost element and setting a match number regarding the domain name at k−1 when a mismatch first occurs at the k-th element; successively comparing each element of the path name of the location information of the requested content with each element of the path name of the location information stored in the storage means starting from the leftmost element and setting a total match number regarding the domain name and the path name at k+n−1 when a mismatch first occurs at the n-th element in cases where all the elements of the domain name of the location information of the requested content coincide with those of the domain name of the location information stored in the storage means; and applying location information stored in the storage means and having the maximum match number regarding the domain name or the maximum total match number regarding the domain name and the path name as the location information satisfying the prescribed rule.

Optionally, in the parameter setting/storing method in accordance with the present invention, when multiple pieces of location information having the same total match number regarding the domain name have been stored in the storage means and the multiple pieces of location information differ only in the leftmost element of the domain name, one of the multiple pieces of location information having "www" as the leftmost element of the domain name is applied as the location information satisfying the prescribed rule.

Therefore, by the present invention, parameter settings made once by the user for desired content are memorized and the parameters are applied also when the content is visited again by the user, by which the need of the complicated user operations is eliminated. Further, the parameters are applied not only to the browsing of the content for which the parameters have been memorized but also to the browsing of other content related to the content, by which the convenience is enhanced further.

The parameter setting/storing method in accordance with the present invention may further comprise a step of receiving a user operation for changing a parameter through a user interface. When a parameter is changed by the user operation, the changed parameter is stored in the storage means while being associated with the location information of the currently displayed content.

Therefore, by the present invention, an effect as if the browser were successively learning the user's favorite display can be provided to the user by memorizing and accumulating the updated display parameters, by which the user can constantly enjoy appropriate display.

Optionally, in the parameter setting/storing method in accordance with the present invention, when the changed parameter is stored in the storage means while being associated with the location information, the changed parameter is stored associated with only one of the location information, upper-level location information and lower-level location information if data identical with the changed parameter has already been stored in the storage means while being associated with the upper-level location information or the lower-level location information.

Optionally, in the parameter setting/storing method in accordance with the present invention, when the changed parameter is stored in the storage means while being associated with the location information, the storing of the changed parameter is canceled while just storing other changed parameters not stored in the storage means yet if parameter data identical with the changed parameter has already been stored in the storage means while being associated with upper-level location information or lower-level location information.

Optionally, in the parameter setting/storing method in accordance with the present invention, for a parameter whose value has not been set yet among the parameters associated with the location information corresponding to the requested content stored in the storage means, the parameter data that has been associated with upper-level location information is applied as the parameter of the requested content if the upper-level location information has been stored in the storage means and the parameter data has been stored associated with the upper-level location information.

According to claim 9, in the parameter setting/storing method in accordance with the present invention, a default value of the parameter is applied as the parameter of the requested content when the parameter has not been stored for any of the upper-level location information.

Optionally, in the parameter setting/storing method in accordance with the present invention, parameters stored in the storage means are selectively deleted based on at least one selected from among information on a parameter update date/time, information on a parameter, acquisition date/time and information on the number of times of parameter acquisition.

Optionally, in the parameter setting/storing method in accordance with the present invention, when multiple pieces of location information having the same match number regarding the domain name or having the same total match number regarding the domain name and the path name have been stored in the storage means, one of the multiple pieces of location information that is applied the latest or is applied the largest times regarding at least one selected from among information on a parameter update date/time, information on a parameter acquisition date/time and information on the number of times of parameter acquisition is applied.

Preferably, in the parameter setting/storing method in accordance with the present invention, a plurality of parameter sets, each of which includes a set of parameters to which parameter data has been preset, are stored in the storage means, and information indicating which of the parameter sets should be applied is stored in the storage means while being associated with the content location information.

Optionally, in the parameter setting/storing method in accordance with the present invention, the storage means is installed in a terminal.

Optionally, in the parameter setting/storing method in accordance with the present invention, the storage means is installed in a server on a network.

In the parameter setting/storing method in accordance with the present invention, a condition of the application of the parameters to the process for the browsing of the requested content can be set for each of the parameters associated with the location information satisfying the prescribed rule.

Or a condition of the application of the parameters to the process for the browsing of the requested content can be set for each category of the parameters associated with the location information satisfying the prescribed rule.

In accordance with another aspect of the present invention, there is provided a computer program for letting a computer implement: a function of storing parameters necessary for browsing of content in storage means while associating the parameters with location information of the content; a function of acquiring parameters that have been stored in the storage means while being associated with location information identical with location information of requested content from the storage means when such location information identical with the location information of the requested content has been stored in the storage means, while acquiring parameters that have been stored in the storage means while being associated with location information satisfying a prescribed rule from the storage means when no location information identical with the location information of the requested content has been stored in the storage means and such location information satisfying the prescribed rule has been stored in the storage means; and a function of applying the acquired parameters to a process for the browsing of the requested content.

In accordance with still another aspect of the present invention, there is provided a terminal device comprising: means which stores parameters necessary for browsing of content in storage means while associating the parameters with location information of the content; means which acquires parameters that have been stored in the storage means while being associated with location information identical with location information of requested content from the storage means when such location information identical with the location information of the requested content has been stored in the storage means, while acquiring parameters that have been stored in the storage means while being associated with location information satisfying a prescribed rule from the storage means when no location information identical with the location information of the requested content has been stored in the storage means and such location information satisfying the prescribed rule has been stored in the storage means; and means which applies the acquired parameters to a process for the browsing of the requested content.

BRIEF DESCRIPTION OF THE DRAWINGS

FIG. 6 shows table structure of a parameter management database.

FIG. 7 shows each piece of parameter data.

FIG. 10 shows each piece of parameter data for the URLs shown in FIG. 9.

FIG. 11 shows mode files (parameter sets).

FIG. 12 shows table structure of the parameter management database.

Figure 1:
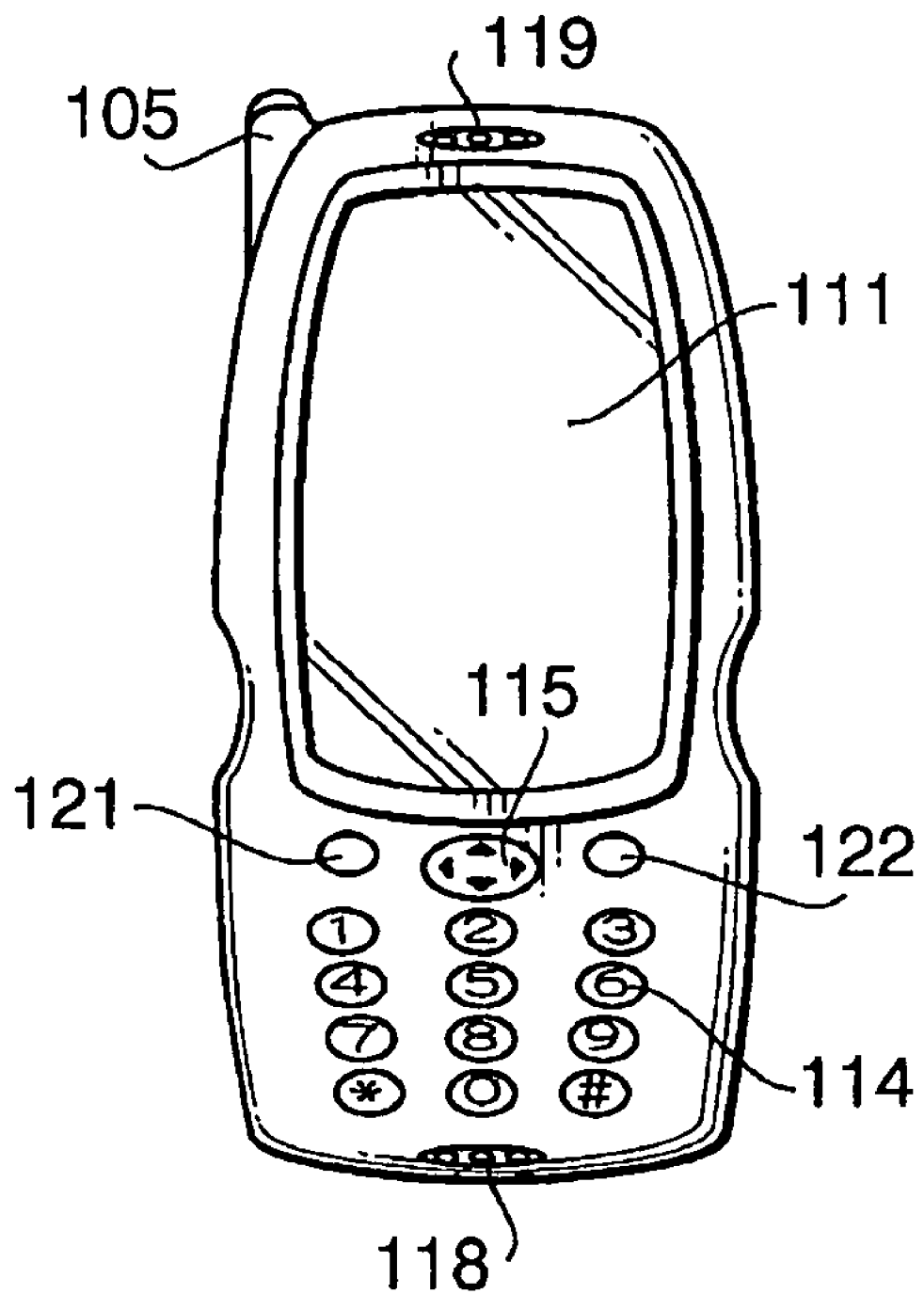
FIG. 1 is an external view of a cellular phone (equipped with a browser which is used for setting parameters) in accordance with an embodiment of the present invention.

DESCRIPTION OF REFERENCE CHARACTERS 10 cellular phone
100 CPU
101 ROM
102 RAM
103 flash memory
104 wireless communication control unit
105 antenna
111 liquid crystal display
113 input interface unit
201 browser engine
202 parameter management system
211 default parameter database
212 parameter management database
221 parameter management server
222 Web server
223 information communication device

BEST MODE FOR CARRYING OUT THE INVENTION

Figure 2:
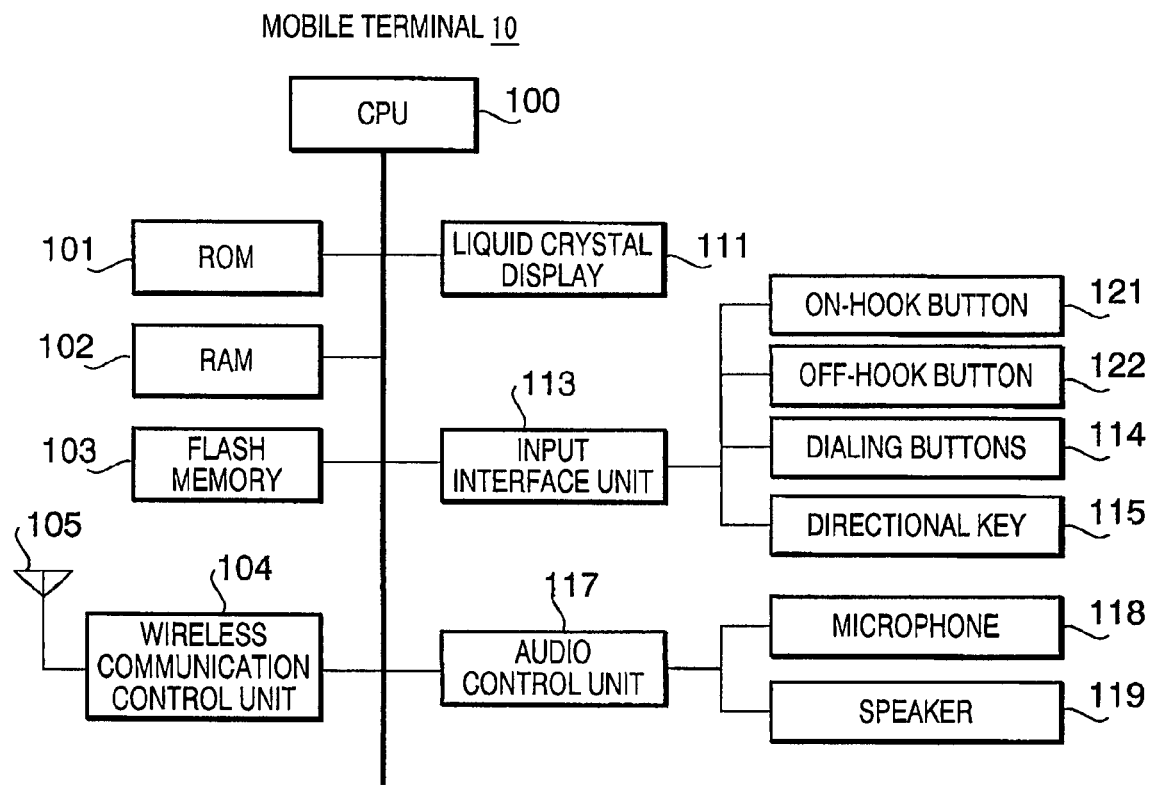
FIG. 2 is a block diagram showing the hardware configuration of the cellular phone shown in FIG. 1.

FIG. 1 is an external view of a cellular phone 10 (equipped with a browser which is used for setting parameters) in accordance with an embodiment of the present invention. FIG. 2 is a block diagram showing the hardware configuration of the cellular phone 10. As shown in the external view of FIG. 1, an operating surface of the casing of the cellular phone 10 is provided with a liquid crystal display 111 and an operation unit. The operation unit includes dialing buttons 114, a directional key 115, an on-hook button 121 and an off-hook button 122. An antenna 105 and openings for a speaker 119 are formed at the top of the operating surface, while openings for a microphone 118 are formed at the bottom of the operating surface. While a cellular phone is described in this embodiment as an example of a terminal device equipped with a browser which is used for setting parameters, the parameter setting function which will be described below can be implemented not only on cellular phones but also on various types of terminal devices.

The block diagram of FIG. 2 will be explained below. The cellular phone 10 includes a CPU 100 for controlling the whole of the cellular phone 10. The CPU 100 is connected with a ROM 101, a RAM 102, a flash memory 103, a wireless communication control unit 104, the liquid crystal display 111, an input interface unit 113 and an audio control unit 117. The antenna 105 is connected to the wireless communication control unit 104. Various keys of the operation unit are connected to the input interface unit 113. The microphone 118 and the speaker 119 are connected to the audio control unit 117.

The ROM 101 is a nonvolatile read-only memory storing various programs to be executed by the CPU 100 and fixed data. The RAM 102 is a rewritable memory which provides the CPU 100 with work areas and temporary data storage areas. The flash memory 103 is a nonvolatile rewritable memory storing additional application programs and various data.

The wireless communication control unit 104 has a function of executing wireless voice/data communication (transmission and reception) with base stations via the antenna 105. The liquid crystal display 111 forms a display unit having a display screen. The input interface unit 113 has a function of receiving input operations of the user through the dialing buttons 114 and the directional key 115 of the operation unit. The audio control unit 117 is connected with the microphone 118 and the speaker 119. The audio control unit 117 controls the input and output of sound via the microphone 118 and the speaker 119.

Figure 3:
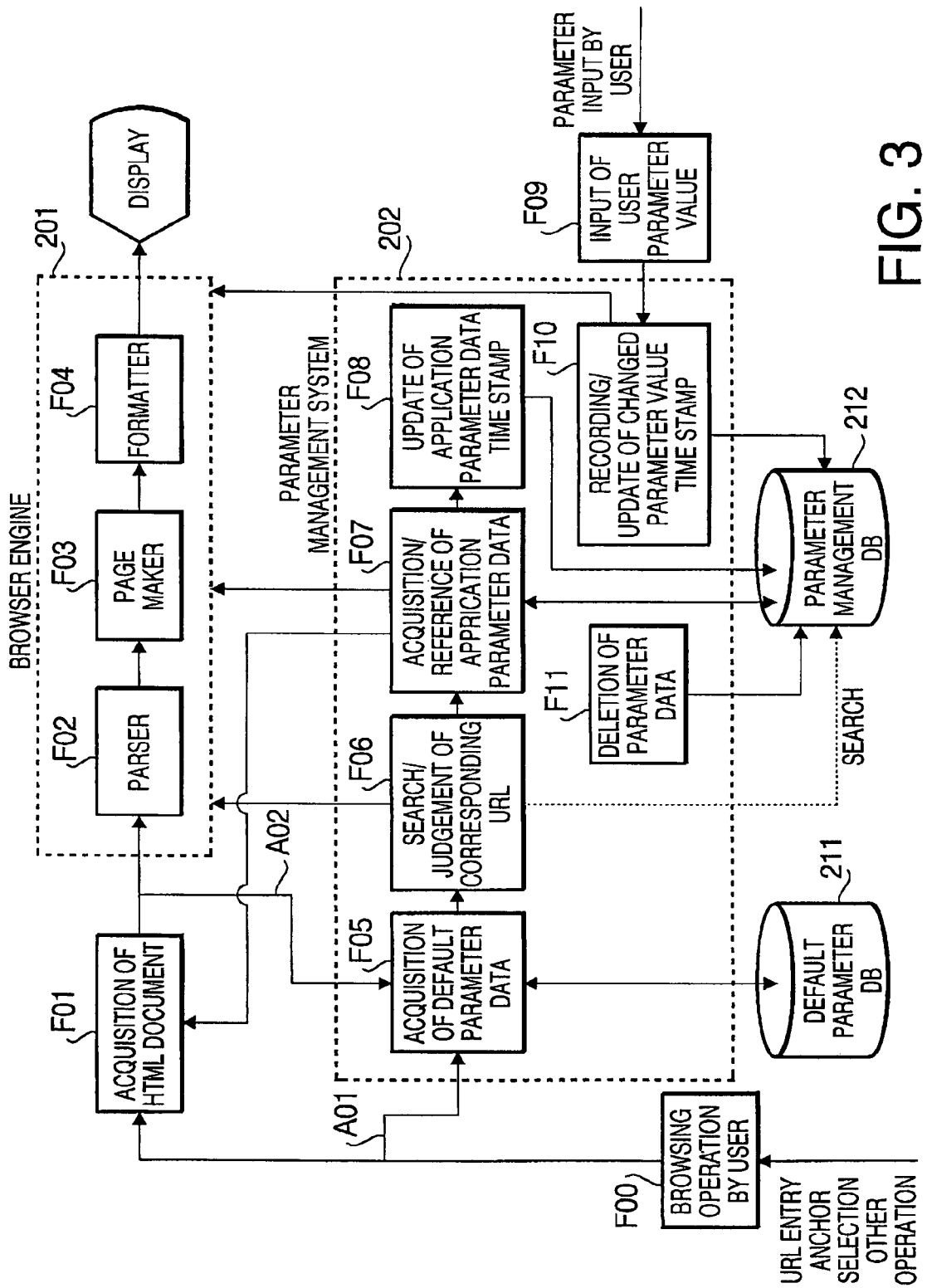
FIG. 3 is a functional block diagram showing functions of a browser operating under the control of a CPU of the cellular phone.

In the cellular phone 10 configured as above, a browser stored in the ROM 101 is activated when a prescribed operation is performed by the user through the operation unit. With the activation of the browser, the cellular phone 10 is connected to a communication network via the wireless communication control unit 104 and the browsing of Web pages becomes possible. FIG. 3 is a functional block diagram showing functions of the browser operating under the control of the CPU 100. The parameter setting function of the cellular phone 10, which is necessary for the browsing of Web pages by the user, will be explained below referring to the functional block diagram of FIG. 3.

First, the basic operation of the browser will be explained. When a URL (Uniform Resource Locator) is designated by the user by key entry of the URL or a selection of an anchor on a currently displayed Web page (F00), the browser acquires document data described in a markup language (HTML, XML, etc.) via the communication network (F01). The following explanation will be given taking an HTML document as an example.

In a browser engine 201, a parser (F02) interprets the logical structure of the acquired HTML and thereby generates a document tree in regard to the structure of the HTML document. Incidentally, the document tree does not include information on expressions of the document. Subsequently, a page maker (F03) generates a layout tree, including information on expressive forms (block, inline, table, list, item, etc.) specified by tags, based on the document tree. The layout tree represents the order of arrangement of blocks, inlines, tables, etc. in the HTML document. Incidentally, the layout tree does not include detailed information on the layout, such as the position, the width and the height of each of the elements on the screen, the position of a line feed in a character string, etc.

A formatter (F04) sets the layout based on the layout tree and by use of information on the actual display screen such as the width of the display screen. Specifically, the formatter (F04) successively places the elements of the layout tree on the actual display screen and determines the line feed positions of character strings and the position, width and height of each element on the screen. By the above process by the browser engine (parser, page maker, formatter), a Web page is displayed on the display screen of the cellular phone 10. While the browser has the function of interpreting the HTML document and setting the layout based on the result of the interpretation by use of the browser engine 201 as explained above, the browser also has functions of acquiring and processing various data (image, video, style sheet, ECMAscript, plug-in, audio data, etc.) specified by prescribed tags in the HTML document based on the result of the interpretation by the browser engine 201, generating a Web page including the various data, and displaying the generated Web page (unshown). For example, when the browser judges that display of image data according to an <img> tag is necessary based on the interpretation by the parser (F02) and the page maker (F03) of the browser engine 201, the browser acquires the specified image data from a specified storage site, properly executes a decoding process, a resizing process and a drawing process, and hands over the processed image data to the browser engine 201. The browser engine 201 makes a display by placing the image data on the screen together with text data, etc. In the case of a style sheet, the browser acquires specified style sheet data and hands over the acquired style sheet data to the browser engine 201, and the browser engine 201 executes the layout process based on the style sheet data. Incidentally, the browser implements the browser engine 201 (and functions of executing processes regarding other necessary data included in the above Web data) according to parameter data.

Next, functions of a parameter management system 202 will be described. According to the embodiment of the present invention, in order to achieve the optimum display of each Web page during the Web page browsing, parameter data necessary for the acquisition of the HTML document of the Web page (e.g. the acceptance/blockage of cookies) and parameter data necessary for the layout process (e.g. showing/not showing of image data) are set to the browser (parameter setting) based on the designated URL. The Web page layout process includes an audio output process for the Web page. The "parameters" mean parameters that are necessary when a Web page is browsed by the user. Specifically, the parameters include parameters necessary for Web page expressions (parameters necessary for the page acquisition process and the page display/reproduction process) and other parameters necessary for the Web page browsing by the user (e.g. parameters regarding key operation settings on the browser). More specifically, the parameters necessary for Web page expressions include, for example, parameters regarding loading/unloading of image data, restriction on the maximum image size, restriction by image formats, enable/disable of animation, the maximum number of repetitions of animation, the image display magnification, the switching of the color subtraction algorithm, enable/disable of Flash, the font size, the font type, the interval/stoppage of character blinking, the interval/stoppage of marquee display, the ON/OFF of Japanese hyphenation, the ON/OFF of wordwrap, the ON/OFF of CSS (Cascading Style Sheet), the ON/OFF of external style sheets, the ON/OFF of default SS, the ON/OFF of external ECMA, the ON/OFF of framesets, the ON/OFF of tables, detailed settings regarding tables, the ON/OFF of automatic page update, recognized character codes, permission for the change of UserAgent, the ON/OFF of ECMAscript, the ON/OFF of the referrer, enable/disable of sound, enlargement/reduction of the whole page, etc. The parameters further include those downloaded via the browser (e.g. UserScript). The parameter data regarding these parameters are call up by the parameter management system 202 from a default parameter database 211, or from a parameter management database 212 through a search.

The URL data is sent to the parameter management system 202 after the designation of the URL (F00) in order to shift to a parameter searching process for parameters to be applied to obtain an HTML document, as indicated by an arrow A01. The URL data is sent to the parameter management system 202 also after the acquisition of the HTML document (F01) in order to shift to a parameter searching process for parameters to be applied to a Web page layout process, as indicated by an arrow A02. The parameter management system 202 first acquires default parameter data from the default parameter database 211 (F05). Subsequently, the parameter management system 202 searches the parameter management database 212 to check whether or not a URL corresponding to the designated URL has been stored in the parameter management database 212 (F06). The "URL corresponding to the designated URL" includes not only an URL perfectly identical with the designated URL (exact match) but also URLs satisfying rules which will be described later. Incidentally, the rules for the corresponding URLs can be changed for each parameter, or for each parameter category (explained later).

When a URL corresponding to the designated URL exists in the parameter management database 212 and parameter data associated with the URL (application parameter data) have also be stored, the application parameter data are referred to and acquired (F07). When values of the application parameter data are different from those of the default parameter data, the default data are overridden by the application parameter data and the result is handed over to the HTML document acquisition function (F01) or to the browser engine 201. In the case where the application parameters are referred to and acquired, a "last reference time" and "the number of references" regarding the URL are updated (F08).

Meanwhile, when the parameter settings are changed by the user (hoping for the optimum display, etc. of a Web page during the Web page browsing) by operating a setting menu, etc. of the browser (F09), the parameter management system 202 hands over parameter change data to the browser engine 201, by which the browser engine 201 properly modifies the layout process, etc. Further, the parameter management system 202 changes the parameter data regarding the page (URL) which have been stored in the parameter management database 212 while updating update time data (F10). Since there are cases where some of the data stored in the parameter management database 212 (data which have not been referred to for a long time, data of low usage frequency, etc.) have to be deleted in consideration of the capacity of the database, the parameter management system 202 has a function of properly deleting parameter data by setting a time limit, other conditions, etc. (F11).

Therefore, by the embodiment of the present invention, when the parameter settings are changed by the user, the parameter management system 202 records/updates the parameter data in the parameter management database 212 while associating them with the URL of the Web page, by which the user can constantly enjoy the optimum display without the need of being particularly conscious of the settings. Further, by repeating the process, a feeling as if the browser were successively learning the user's favorite display can be provided to the user.

Figure 4:
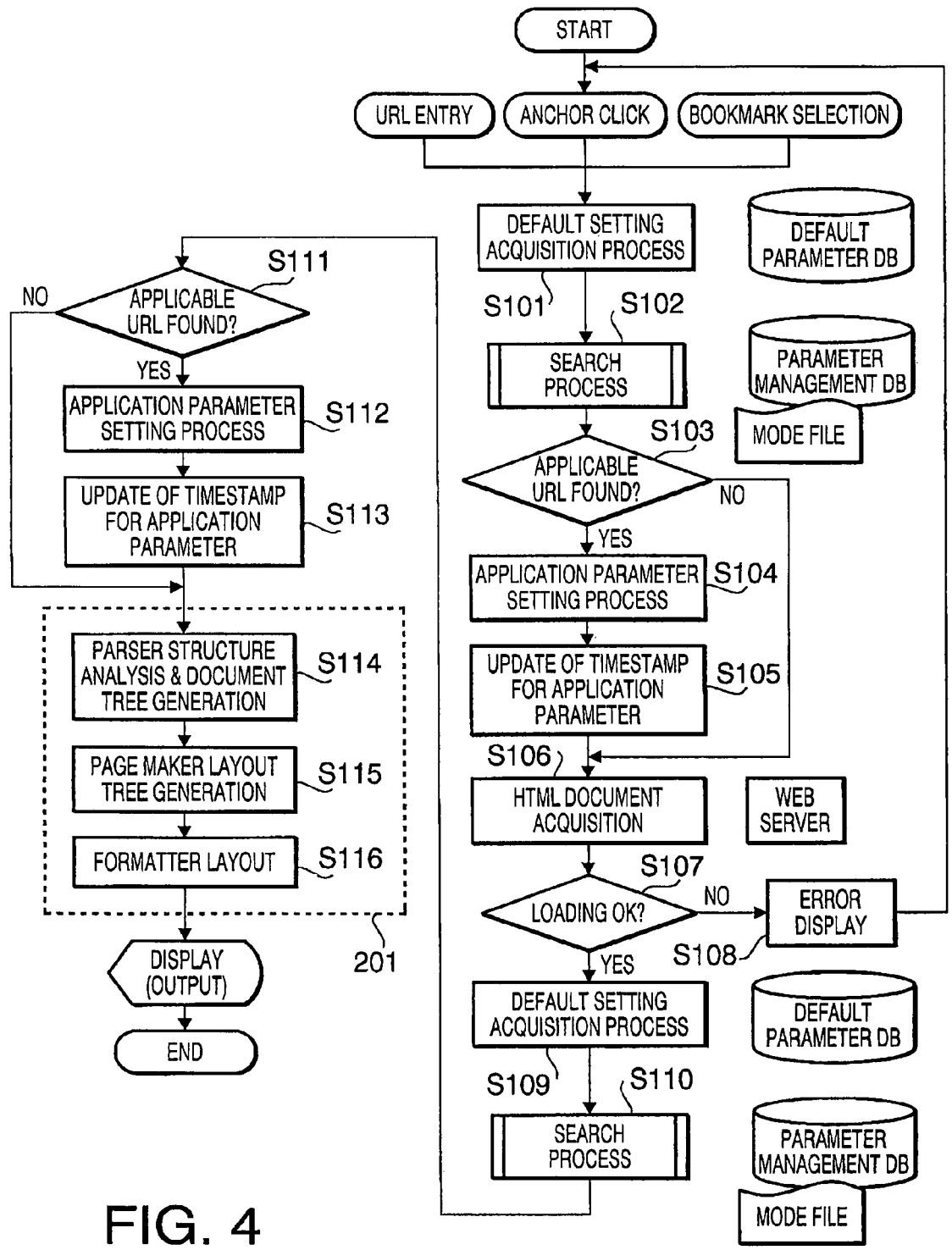
FIG. 4 is a flow chart showing a parameter setting process.

FIG. 4 is a flow chart showing a process for displaying a Web page by use of the above parameter setting function of the browser. This operation is performed under the control of the CPU 100.

When a URL is designated by the user by entering the URL, clicking on an anchor, selecting a bookmark, selecting a page from the history list, etc., a default setting acquisition process regarding parameters necessary for the HTML document acquisition process is started (step S101). In this step, the default value of parameter data corresponding to each parameter is acquired from the default parameter database 211.

In the next step S102, the parameter management database 212 is searched in order to check whether or not an URL perfectly identical with the designated URL or satisfying the conditions (rules) which will be described later (applicable URL) has been stored in the parameter management database 212. When an applicable URL is judged to have been stored in the parameter management database 212 (step S103: YES), the process advances to an application parameter setting process of step S104. When no applicable URL is judged to have been stored in the parameter management database 212 (step S103: NO), the process advances to step S106 while applying the default values as the application parameters.

In the step S104, among the parameter data associated with the applicable URL found in the search of the step S102, those differing from the default values acquired in the step S101 are applied while overriding the default values. Subsequently, the update time data corresponding to the URL is updated and stored in the parameter management database 212 (step S105). Incidentally, the steps S102-S105 are executed for each parameter, that is, repeated for the number of parameters necessary for the HTML document acquisition process. Subsequently, an HTML document is acquired from a Web server according to the application parameter settings (step S106).

In case of an error in the loading of the HTML document (step S107: NO), an error display is made on the screen (step S108) and the process returns to the state before the user operation. When the HTML document is loaded successfully (step S107: YES), the process advances to step S109.

In the step S109, a default setting acquisition process regarding parameters necessary for the Web page layout process is started. In this step, default values of parameter data are acquired from the default parameter database 211 similarly to the step S101. In the next step S110, the parameter management database 212 is searched in order to check whether or not an applicable URL has been stored in the parameter management database 212. When an applicable URL is judged to have been stored in the parameter management database 212 (step S111: YES), the process advances to application parameter setting of step S112. When no applicable URL is judged to have been stored in the parameter management database 212 (step S111: NO), the process advances to a process executed by the parser of the browser engine 201 (step S114) while applying the default values as the application parameters.

In the step S112, among the parameter data associated with the applicable URL found in the search of the step S110, those differing from the default values acquired in the step S109 are applied while overriding the default values. Subsequently, the update time data corresponding to the URL is updated and stored in the parameter management database 212 (step S113). Incidentally, the steps S110-S113 are executed for each parameter, that is, repeated for the number of parameters necessary for the Web page layout process.

By the parser of the browser engine 201, the structure analysis and the document tree generation are carried out according to the parameter values (step S114). Subsequently, the layout tree is generated by the page maker (step S115). Finally, the layout is set by the formatter (step S116). A Web page is displayed on (outputted to) the screen of the terminal through the above steps, and the process of FIG. 4 is ended. Incidentally, the search process of the step S103 or S111 and the application parameter setting process of the step S104 or S112 may also be executed at proper timing for each parameter depending on the type of the parameter. Even when a proper URL corresponding to the designated URL has been stored in the parameter management database 212, the overriding process for the parameter values is not executed when the parameter data found in the parameter management database 212 are identical with the default values.

Figure 5:
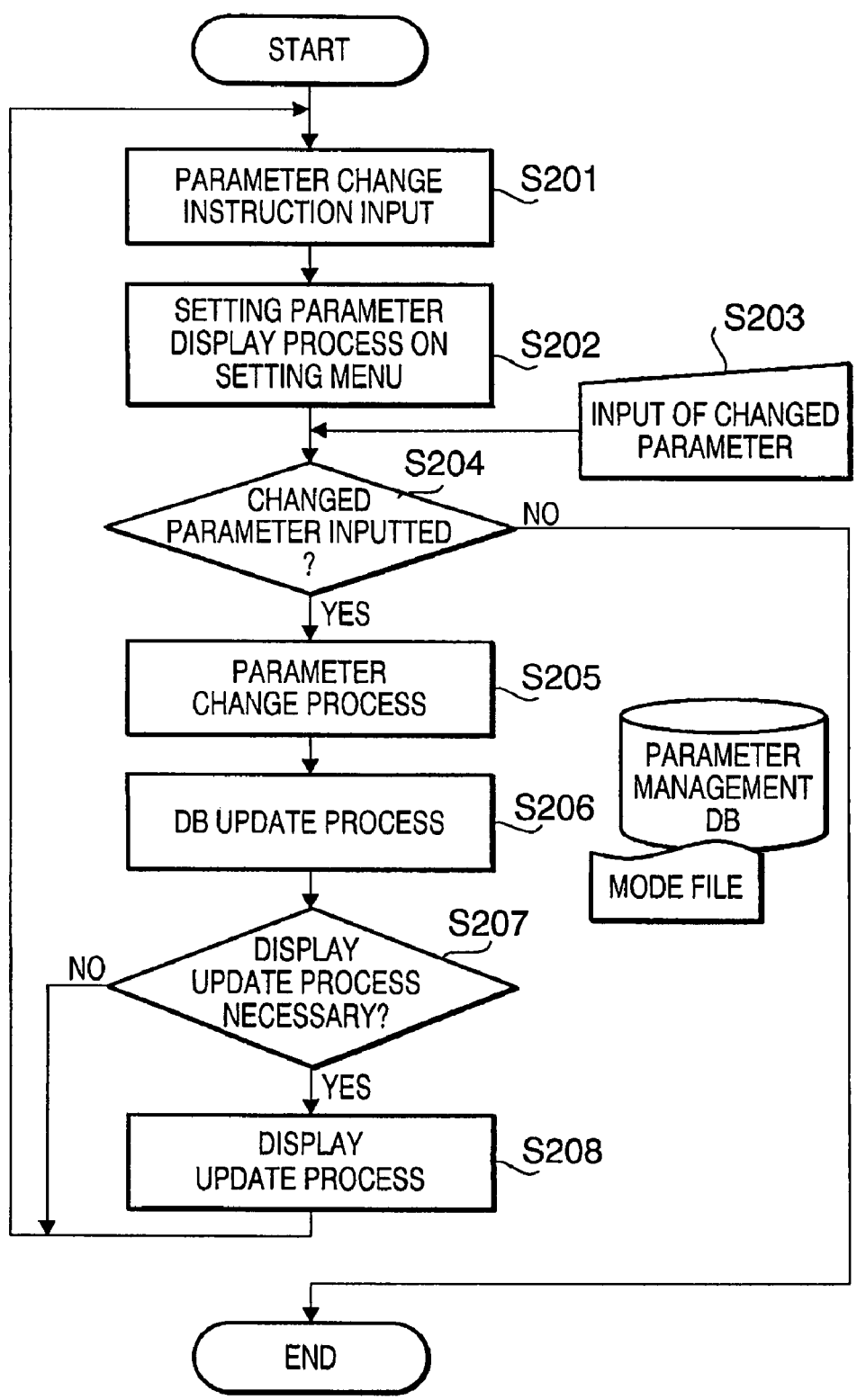
FIG. 5 is a flow chart showing a parameter update process.

An update process which is executed when a parameter is inputted by the user will be explained below. FIG. 5 is a flow chart showing the parameter setting update process. When a parameter change instruction input is made by the user (step S201), a setting menu for the parameter setting is displayed on the screen (step S202) and the user inputs a parameter to be changed (step S203). When changed parameter data is inputted by the user (step S204: YES), a parameter change process is started (step S205). The parameter management database 212 is updated in regard to the changed parameter data while also writing the update time data therein (step S206). When the browser display has to be updated due to the change in the parameter data (step S207: YES), a display update process is executed (step S208) and thereafter the process returns to the start of the process of FIG. 5. When the display update process is unnecessary (step S207: NO), the process directly returns to the start of the process of FIG. 5. When no changed parameter is inputted by the user in the step S204 (S204: NO), the process is ended.

Next, the parameter management database 212 will be explained. An example of table structure of the parameter management database 212 is shown in FIG. 6. Various data such as the parameter data, the update time, the last reference time and the number of references are associated with one another in regard to each URL. The last reference time is data representing the last date/time of the execution of the browsing process applying the parameter data associated with the URL. The number of references represents how many times the parameter management system 202 has acquired or referred to any of the parameter data that has been associated with the URL. Incidentally, it is possible to leave out the data of the last reference time and/or the number of references. Or either the update time or the last reference time may be omitted. The parameter management database 212 may be configured to properly delete old data based on the update time or the last reference time. The parameter management database 212 may also be configured to properly delete data of low reference frequency based on the number of references. It is also possible to apply expiration data representing expiration date/time of parameter data and delete the parameter data according to the expiration date/time.

As shown in FIG. 7, the parameter data in the table of FIG. 6 include, for example, data regarding the cookie, image acquisition, image size, font, ECMAscript, etc. In the following, each of the parameters will be explained. Incidentally, FIG. 7 is just a conceptual diagram of the parameter data, and thus the method of storing the values of the parameters (numerical values, symbols, etc.) is not particularly limited.

The cookie is a function which is used for the identification of each user, for example, in which the provider of a Web site temporary writes cookie data in the terminal of the visitor through the browser. In accordance with the embodiment of the present invention, the acceptance/blockage of the cookie function can be memorized for each URL.

As the parameter regarding the image acquisition, parameter data representing whether to download an image file of a Web page image specified in the HTML document (ON) or not (OFF) can be memorized for each URL in accordance with the embodiment of the present invention.

As the parameter regarding the image size, parameter data representing an image display size (large, middle, small, etc.), to be applied when a downloaded image file is displayed on the screen during the browsing, can be memorized for each URL in accordance with the embodiment of the present invention. Incidentally, when the image acquisition parameter data of the URL "www.hello.co.jp/news/today" is OFF as shown in FIG. 7, for example, the image size parameter data is automatically set at "N/A" (Not Available) since no image data is downloaded.

As the parameter data regarding the font size, parameter data representing a text display size (large, middle, small, etc.), to be applied when text data in the Web page is displayed on the screen during the browsing, can be memorized for each URL in accordance with the embodiment of the present invention.

The ECMAscript (simple programming language which has been developed in order to add motion and interactivity to Web pages) is installed in ordinary browsers. Since execution of an ECMAscript process during Web page browsing can extremely slow down the operation of the browser, parameter data representing the ON/OFF of the ECMAscript process can be memorized for each URL in accordance with the embodiment of the present invention.

Incidentally, when a piece of parameter data memorized for the currently browsed URL is "-" (meaning that the parameter data has not been set yet), a corresponding piece of parameter data which has been memorized for an upper-level URL is applied. When the corresponding parameter data has not been memorized for the upper-level URL, the default value of the parameter is applied. The parameters are not restricted to those shown in FIG. 7. For example, parameters necessary for the HTML document acquisition can include the cookie, referre, UserAgent, etc. Further, various other parameters regarding sound, image (e.g. animation), plug-in, font, layout (table, frame, etc.), style sheet, etc. are set. There can also be parameters regarding the operation keys.

It is possible to leave out the storage (memorization) of parameter data of a URL when the parameter data is identical with that of an upper-level URL or a lower-level URL. Since parameter data of an upper-level URL or a lower-level URL or the default values can be applied in the case where the parameter data of the URL has not been set, the need of storing the parameter data for the URL can be left out and the increase of data size can be avoided.

Figure 8:
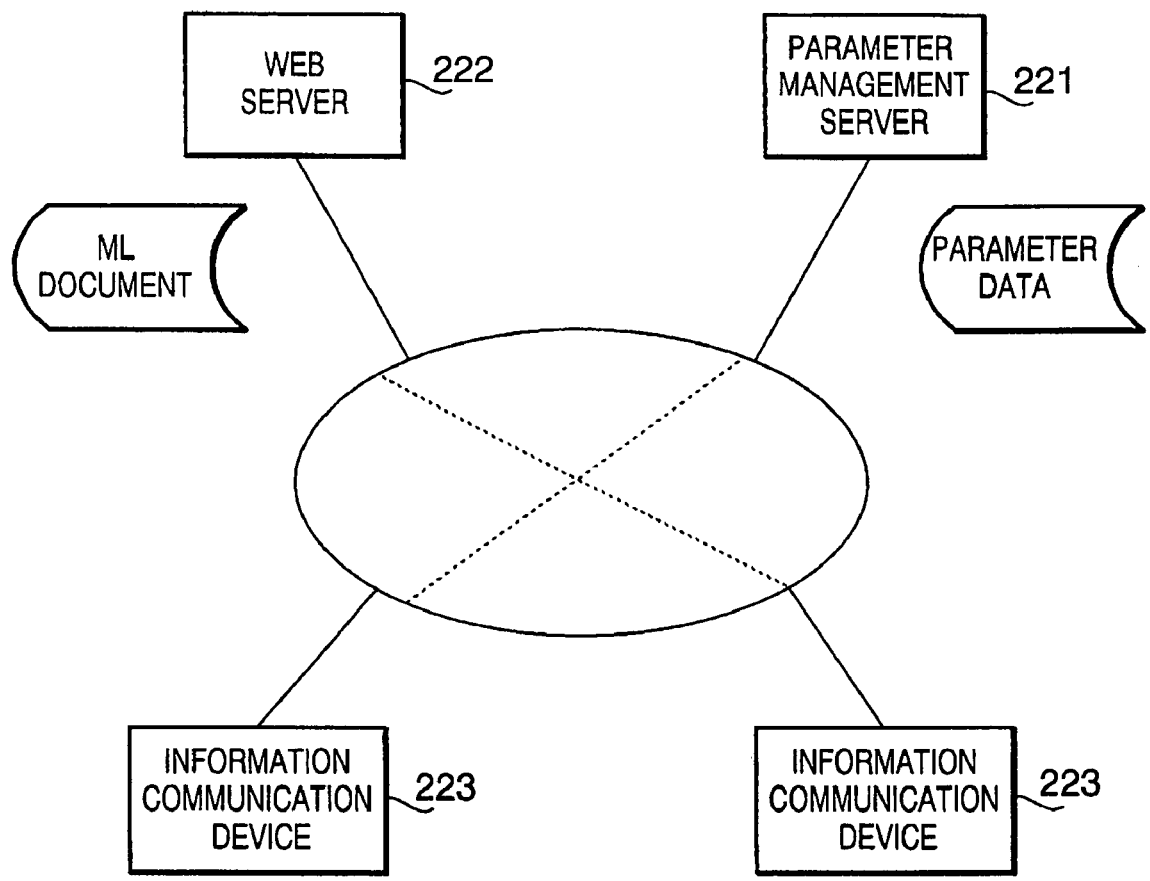
FIG. 8 is a schematic diagram showing a parameter management server connected to the Internet.

An example of a parameter management server on the Internet is shown in FIG. 8. The parameter management database 212 may either be installed in a terminal (information communication device 223) used by a user or in a server (parameter management server 221) on a network such as the Internet. By installing the parameter management database 212 in a server, learning ability regarding the parameter setting can be increased and the user convenience can be enhanced since a lot of parameter data can be stored even for a terminal of a small storage capacity (e.g. cellular phone).

Next, a method for the search for a URL corresponding to the designated URL (step S102 or S110 in FIG. 4) will be explained. The parameter management system 202 searches the parameter management database 212 and thereby judges whether or not a URL corresponding to the designated URL has been stored in the parameter management database 212. The "URL corresponding to the designated URL" includes not only an URL perfectly identical with the designated URL (exact match) but also URLs satisfying the conditions (rules) which will be described below.

In a first rule included in parameter application rules in accordance with the present invention, not only the domain name but also the path name of each URL stored in the parameter management database 212 is compared with the designated URL. A URL (stored in the parameter management database 212) having the longest matching part (longest match), that is, a URL that coincides with the designated URL to the deepest level is referred to and the parameters of the longest match URL are applied. The "longest match" is different from the "exact match" which is perfectly identical with the designated URL. Elements (segmented by dots ".") of the domain name of each URL are successively compared with those of the designated URL starting from the rightmost element since the rightmost element is at the highest level. At the point when a domain name element differing from that of the designated URL is found, the number of domain name elements to the right of the differing element is counted. When the rightmost domain name element differs from that of the designated URL, the count is zero. When all the domain name elements coincide with those of the designated URL and the designated URL includes a path name, the process advances to a path name comparison process. The path name includes elements (folder name, file name) which are segmented by slashes "/". Reversely to the case of the domain name, elements of the path name are successively compared with those of the designated URL starting from the leftmost element. At the point when a path name element differing from that of the designated URL is found, the number of path name elements to the left of the differing element is counted. When the leftmost path name element differs from that of the designated URL, the count is zero. The count regarding the domain name and the count regarding the path name are added together and the sum is regarded as a "match number" (the number of matches) of the URL.

In a second rule, when there are two or more longest match URLs (having the same match number) according to the first rule and the domain names of the longest match URLs are different from one another, priority is given to one of the URLs whose leftmost domain is "www". For example, when the designated URL is "http://music.access.co.jp" and there are two URLs (1) "http://www.access.co.jp" and (2) "http://news.access.co.jp" stored in the database, the two URLs have the same match number "3"; however, parameters of the URL (1) are applied. In the case where two or more URLs have the same match number, the selection of a URL (application of parameters) may also be made based on other data such as the last reference time (selecting one of the URLs that was used the most recently) or the number of references (selecting one of the URLs that was used the most frequently), for example.

In a third rule, among the parameters of the URL satisfying the above rules, parameters whose values have not been set yet are set by use of (1) parameter data of an upper-level URL stored in the parameter management database 212 and (2) the default parameter data, giving priority in this order. Optionally, the above rules may be applied for each parameter. Incidentally, when rightmost two domain name elements of a URL do not perfectly coincide with those of the designated URL, it is desirable to stop applying the parameters of the URL.

Figure 9:
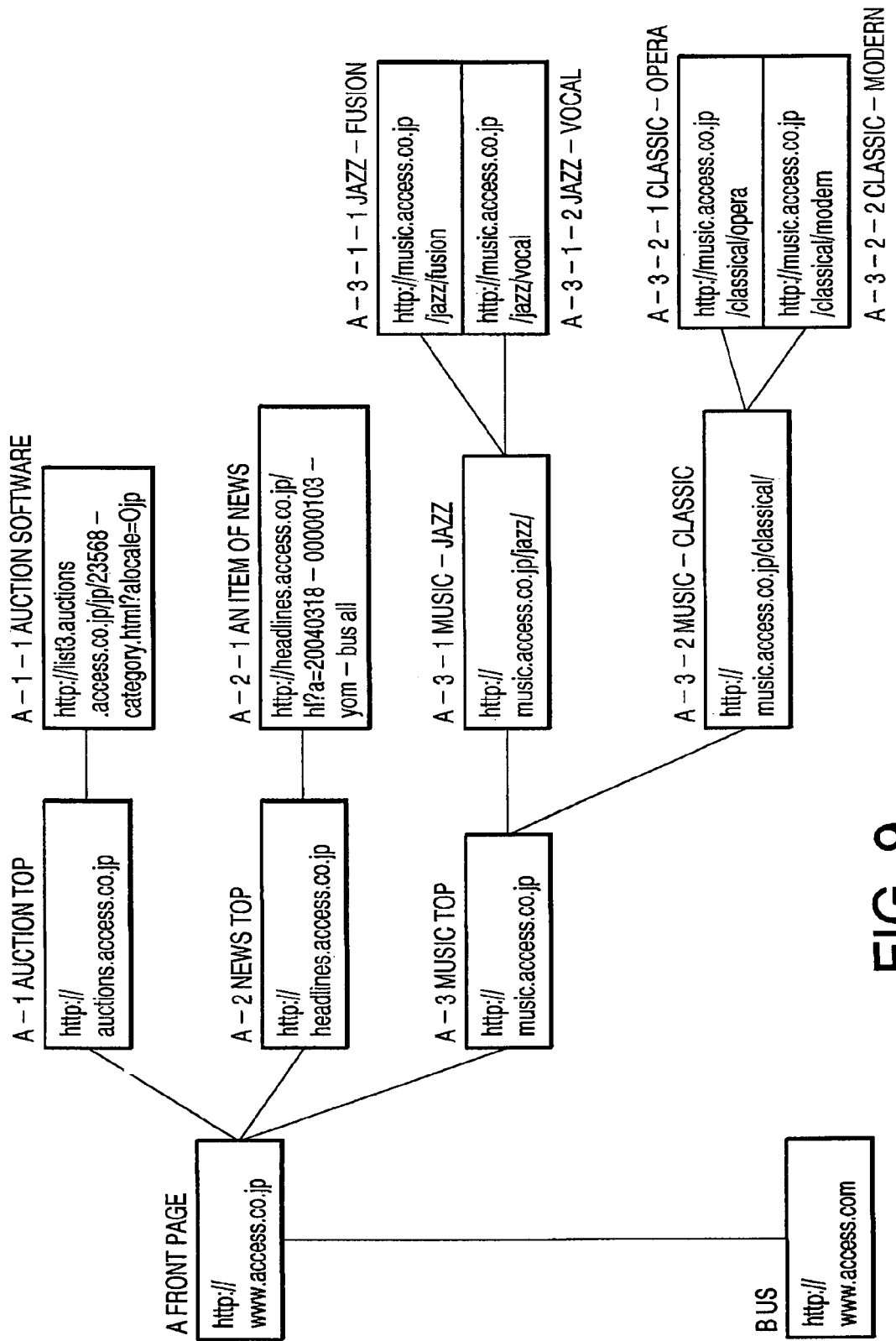
FIG. 9 shows tree structure of URLs.

An example of tree structure of URLs is shown in FIG. 9 in order to explain the above rules more concretely. In FIG. 9, the URL A-3-1-1 is "http://music.access.co.jp/jazz/fusion", in which "music.access.co.jp" is the domain name, "music" is an element of the domain name, and "jazz" and "fusion" are elements of the path name. The comparison of the domain name is made starting from the rightmost element Op →co→access→music). On the other hand, the comparison of the path name is made starting from the leftmost element (jazz→fusion). The number regarding the domain name is counted in units of elements which are segmented by dots ".", while the number regarding the path name is counted in units of elements which are segmented by slashes "/". For example, when the designated URL is the URL A ("http://www.access.co.jp"), the match number of the URL A-3-1-1 is 3.

FIG. 10 shows an example of default data stored in the default parameter database 211 and examples of parameter data (corresponding to the URLs shown in FIG. 9) stored in the parameter management database 212, wherein only part of the parameters are shown as excerpts. When the parameters of the URL A-3-2 are referred to, the parameters "image", "text" and "ECMAscript" are "-" (no set value) even though the "sound" has been set at "ON". In this case, the parameters of the upper-level URL A-3 are configured such that "image" is set to "enable" and "ECMAscript" is set to "disable", and thus those parameter data are applied. As for the parameter data "text", the parameter data "small" of the still upper-level URL A is applied. When there exists no upper-level URL or when no upper-level URL has parameter data, the default value is applied. As above, the parameter setting is made properly for each piece of parameter data.

When the URL A-3-1 "http://music.access.co.jp/jazz" is browsed, the URL A-3-1-1 "http://music.access.co.jp/jazz/fusion" has the largest match number 5 (longest match) in the URLs stored in the parameter management database 212 and thus the parameter data of the URL A-3-1-1 are applied.

When the URL A-3-1-2 is browsed, the URL A-3-1-1 having the largest match number 5 is applied. The URL having the largest match number is applied even when there is a differing part (e.g. the element "vocal" of the path name of the URL A-3-1-2 and the element "fusion" of the path name of the URL A-3-1-1). If we assume that the application of the URL having the largest match number has to be stopped when there is a differing part (even though most of the elements coincide with each other), of course there is no problem when the parameters have been set for the immediately upper-level URL (e.g. the URL A-3-1 for the URL A-3-1-2). However, when no set value is found until a far (remote) upper level (e.g. the URL A), the settings of the remote upper-level URL or the default settings have to be applied. On the other hand, this embodiment provides a greater convenience since parameter data closer to those desired by the user (compared to the default values or the parameter data of a remote upper-level URL) can probably be obtained by taking over the parameters from an almost coinciding URL when there exists such a URL.

When the URL A-2 "http://headlines.access.co.jp" is browsed, the URL A "http://www.access.co.jp" is applied. Since the element "www" exists at the front end of the domain name, the URL A "http://www.access.co.jp" is given higher priority by the second rule than the URL A-1 "http://auctions.access.co.jp" and the URL A-3 "http://music.access.co.jp".

Assuming that only two URLs A-2-1 and A-1-1 have been stored in the parameter management database 212 (ignoring the tree structure shown in FIG. 9 and the parameter data shown in FIG. 10), the URLs A-2-1 and A-1-1 have equal match numbers when the URL A-3-1-1 is browsed. In this case, one of the URLs having a newer "last reference time" or a greater "number of references" is applied, for example. Similarly, when there are a plurality of URLs having the same match number, parameters to be applied are selected based on the last reference time, the number of references, the number of non-matching parts, etc., for example.

Since there are a great number of parameters, the number of combinations of the parameters amounts to a huge number. From this point of view, preparing some combinations of parameters (parameter sets) corresponding to some types of terminals and Web pages, letting the user use the parameter sets, and changing each parameter in the parameter sets as needed may be more suitable for realizing a greater user convenience. Therefore, an example of mode files (parameter sets) in accordance with an embodiment of the present invention will be shown in FIG. 11. For example, the parameter sets may include a standard mode adapting to processing speeds, screen sizes, etc. of PCs, a mobile mode adapting to small screen sizes and low processing speeds, a smart fit rendering mode considering scrollability, a text mode for text-oriented sites like news sites, etc.

An example of such a parameter management database 212 configured to use the above mode files and to memorize changed parts only will be shown in FIG. 12. In this example, the mode can be set for each URL. When an update is made, each piece of parameter data (individual setting) corresponding to the URL is memorized and applied, without making the update of the mode files (parameter sets). For example, even though the mode 0002 (mobile mode) has been selected for "news.access.co.jp" and the ECMAscript for the mobile mode is "ON", the ECMAscript is set to "disable" for this URL. Meanwhile, the date/time of the update is recorded.

While parameters are registered in the parameter management database (or the parameters registered in the parameter management database are changed) each time a setting is made by the user in the above embodiment, it is also possible to prepare some parameter sets that seems to be suitable for the browsing of widely known Web pages (URLs) by use of a product in consideration of the specifications, display screen size, etc. of the product and configure the product so that the prepared parameter sets can be registered in the product's parameter management database before the shipment of the product. In such cases, the user can browse the Web pages by use of parameters appropriate for the product, without the need of making the parameter setting.

While the first through third rules have been described in the above embodiment of the present invention as examples of the parameter application rules, other rules such as a fourth rule specifying that only the identical URL can be referred to, a fifth rule specifying that only URLs as upper-level URLs of the designated URL can be referred to among the URLs having the largest match number, a sixth rule specifying that only URLs within a prescribed number of levels from the designated URL can be referred to in the case where only URLs as the upper-level URLs of the designated URL are referred to among the URLs having the largest match number, etc. may also be applied in addition to the first rule as other embodiments in accordance with the present invention. The fourth through sixth rules are those further restricting the URLs applied by the first rule.

In the embodiments, the above fourth through sixth rules can be set and applied for each parameter or for each parameter category (that is, an applicable URL range can be set for each parameter). It is also possible to set parameter data inherent to the browser (i.e. independent of URLs) for each parameter or each parameter category, without applying any of the above rules. The rule(s) to be applied for each parameter or each parameter category can be selected and set by the user.

As the parameter categories, the following categories are possible, for example.

A) parameters relating to security
cookie, referer, ECMAscript, etc.

B) parameters relating to packets or communication traffic (i.e. parameters whose ON/OFF, etc. are relevant to the communication charge)
image acquisition, plug-in, external CSS, external script, frame, automatic page update, BGM data acquisition, restriction by image formats, enabling/disabling of animation, the maximum number of repetitions, etc.

C) visual parameters (i.e. parameters whose ON/OFF, etc. are relevant mainly to the appearance of the page)
the presence/absence of image display, display magnification, the switching of the color subtraction algorithm, font, Japanese hyphenation, the presence/absence of CSS, the ON/OFF of tables, etc.

Incidentally, the categorization of the parameters may either be preset or be arbitrarily set by the user as needed.

While it can be presumed that a rule like the fourth or fifth rule should be applied to the category "A) parameters relating to security" and a rule like the fourth, fifth or sixth rule should be applied to the category "B) parameters relating to packets or communication traffic", the rules to be applied to those categories are not restricted to the above rules.

In the present invention, which of the above rules should be applied can be determined and set for each parameter or each parameter category. In other words, even when a longest match URL is found by the first rule, the reference to a parameter of the longest match URL can be stopped depending on the parameter. The effect of such a configuration will be explained below. For example, there is a possibility that a totally irrelevant host is selected as "the most similar URL" by the search of the parameter management database 212. In such cases, taking over the parameters related to security (cookie, referer, ECMAscript, etc.) can be undesirable even if taking over the parameters relating to layout is permissible. Therefore, in another embodiment of the present invention, settings capable of restricting URLs to be searched for in the parameter management database 212 (i.e. capable of specifying a range of Web sites that may be affected by the storing of the settings of a certain Web page) are applied for each parameter or for each parameter category (e.g. the category related to security, the category related to the data amount (packet charging), etc.).

It is also possible to employ a configuration not updating the parameter data in the parameter management database 212 upon the setting change of a parameter by the user (F09 in FIG. 3) depending on the parameter or the parameter category. For example, in a case where such a configuration is employed for the parameter cookie only, when some parameters including the cookie are changed during the Web page browsing (all the changed parameter data including the cookie are applied to the currently browsed Web page), the changed parameter data of the cookie is not stored in the parameter management database 212 even though the changed parameter data of parameters other than the cookie are stored in the parameter management database 212. Thus, even when a similar Web page (satisfying the above rules) is browsed next time, it is possible to avoid incorporating the parameter change into the Web page browsing in regard to each parameter or each parameter category.

As described above, by the present invention, an effect as if the browser were successively learning the user's favorite parameters can be achieved by storing various settings for each Web page without requiring the user to be particularly conscious of the settings (i.e. without the need of complicated operations), by which the usability can be enhanced in comparison with the conventional browser functions.

Incidentally, while various settings are stored for each Web page in the above embodiments of the present invention, the technical scope of the present invention is supposed to include "content" as a superordinate concept of "Web page". The "content" is data acquired via a network, which can include not only "Web pages" displayed by so-called browsers but also other data that can be displayed or reproduced by viewers, readers or reproducing applications and that can be specified by location information (e.g. URL). More specifically, the "content" can include document data, video data, audio data and data for restricted purposes (comic, news, mail order, etc.), for example. Parameters for such data can include parameters relating to display (scaling ratio, character size, etc.) and parameters relating to sound (sound volume, modes differing in sound quality, etc.), for example.

What is claimed is:

1. A parameter setting/storing method, comprising the steps of:

storing parameters necessary for browsing of content in a storage unit while associating the parameters with location information of the content, the parameters including parameters used for acquisition of the content and the layout of the content;

judging whether stored location information, which is identical with requested location information locating content for which browsing is requested, has been stored in the storage unit;

acquiring parameters that have been stored in the storage unit that are associated with stored location information which is judged to be identical with the requested location information acquiring parameters that have been stored in the storage unit that are associated with stored location information satisfying a prescribed rule with respect to the requested location information, from the storage unit if it is judged that no location information identical with the requested location information has been stored in the storage unit acquiring the content in accordance with the acquired parameters; and laying out the acquired content in accordance with the acquired parameters.

2. The parameter setting/storing method according to claim 1, wherein the stored location information satisfying the prescribed rule is location information that is the most similar to the requested location information in regard to both a domain name and a path name among all the location information stored in the storage unit.

3. The parameter setting/storing method according to claim 2, further comprising the steps of:

successively comparing each element of the domain name of the requested_location information with each element of the domain name of each piece of the stored location information stored in the storage unit starting from the rightmost element and setting a match number regarding the domain name at k−1 when a mismatch first occurs at the k-th element;

successively comparing each element of the path name of the requested location information with each element of the path name of the stored location information stored in the storage unit starting from the leftmost element and setting a total match number regarding the domain name and the path name at k+n−1 when a mismatch first occurs at the n-th element in cases where all the elements of the domain name of the location information of the requested content coincide with those of the domain name of the location information stored in the storage unit; and applying the stored location information having the maximum match number regarding the domain name or the maximum total match number regarding the domain name and the path name as the stored location information satisfying the prescribed rule.

4. The parameter setting/storing method according to claim 3, further comprising the step of:

applying one of multiple pieces of location information having "www" as the leftmost element of the domain name is applied as the stored location information satisfying the prescribed rule when the multiple pieces of location information having the same total match number regarding the domain name have been stored in the storage unit and the multiple pieces of location information differ only in the leftmost element of the domain name.

5. The parameter setting/storing method according to claim 3, further comprising the step of:

applying, as the stored location information satisfying the prescribed rule, one of multiple pieces of location information that is applied the latest or is applied the largest times regarding at least one selected from among information on a parameter update date/time, information on a parameter acquisition date/time and information on the number of times of parameter acquisition when the multiple pieces of location information having the same match number regarding the domain name or having the same total match number regarding the domain name and the path name have been stored in the storage unit.

6. The parameter setting/storing method according to claim 3, further comprising the step of:

accepting a user operation for setting a condition of the application of the parameters to the process for the browsing of the requested content for each of the parameters associated with the stored location information satisfying the prescribed rule.

7. The parameter setting/storing method according to claim 3, further comprising the step of:

accepting a user operation for setting a condition of the application of the parameters to the process for the browsing of the requested content for each category of the parameters associated with the location information satisfying the prescribed rule.

8. The parameter setting/storing method according to claim 1, further comprising a step of receiving a user operation for changing a parameter through a user interface, wherein:

when a parameter is changed by the user operation, the changed parameter is stored in the storage unit while being associated with the stored location information of the currently displayed content.

9. The parameter setting/storing method according to claim 8, wherein when the changed parameter is stored in the storage unit while being associated with the stored location information, the changed parameter is stored associated with only one of the location information, upper-level location information and lower-level location information if data identical with the changed parameter has already been stored in the storage unit while being associated with the upper-level location information or the lower-level location information.

10. The parameter setting/storing method according to claim 8, wherein when the changed parameter is stored in the storage unit while being associated with the stored location information, the storing of the changed parameter is canceled while just storing other changed parameters not stored in the storage unit yet if parameter data identical with the changed parameter has already been stored in the storage unit while being associated with upper-level location information or lower-level location information.

11. The parameter setting/storing method according to claim 1, wherein for a parameter whose value has not been set yet among the parameters associated with the stored location information corresponding to the requested content stored in the storage unit, the parameter data that has been associated with upper-level location information is applied as the parameter of the requested content if the upper-level location information has been stored in the storage unit and the parameter data has been stored associated with the upper-level location information.

12. The parameter setting/storing method according to claim 11, wherein a default value of the parameter is applied as the parameter of the requested content when the parameter has not been stored for any of the upper-level location information.

13. The parameter setting/storing method according to claim 1, further comprising the step of:

selectively deleting parameters stored in the storage unit based on at least one selected from among information on a parameter update date/time, information on a parameter acquisition date/time and information on the number of times of parameter acquisition.

14. The parameter setting/storing method according to claim 1, wherein:

a plurality of parameter sets, each of which includes a set of parameters to which parameter data has been preset, are stored in the storage unit, and information indicating which of the parameter sets should be applied is stored in the storage unit while being associated with the content location information.

15. The parameter setting/storing method according to claim 1, wherein the storage unit is installed in a terminal.

16. The parameter setting/storing method according to claim 1, wherein the storage unit is installed in a server on a network.

17. The parameter setting/storing method according to claim 1, wherein the content is a Web page.

18. A computer program product comprising a computer-readable storage medium having computer-readable instructions stored thereon, which, when executed by a processor of a terminal device, configures the processor to perform the steps of:
storing parameters necessary for browsing of content in a storage unit while associating the parameters with location information of the content, the parameters including parameters used for acquisition of the content and the layout of the content;
judging whether stored location information, which is identical with requested location information locating content for which browsing is requested, has been stored in the storage unit;
acquiring parameters that have been stored in the storage unit that are associated with stored location information which is judged to be identical with the requested location information,
acquiring parameters that have been stored in the storage unit that are associated with stored location information satisfying a prescribed rule with respect to the requested location information, from the storage unit if it is judged that no location information identical with the requested location information has been stored in the storage unit
acquiring the content in accordance with the acquired parameters; and
laying out the acquired content in accordance with the acquired parameters.

19. The computer program product according to claim 18, wherein the content is a Web page.

20. A terminal device comprising:
a storing control unit that stores parameters necessary for browsing of content in a storage unit while associating the parameters with location information of the content, the parameters including parameters used for acquisition of the content and the layout of the content;
a judging unit that judges whether stored location information, which is identical with requested location information locating content for which browsing is requested, has been stored in the storage unit;
a browsing control unit that acquires parameters that have been stored in the storage unit that are associated with stored location information which is judged to be identical with the requested location information, acquires parameters that have been stored in the storage unit that are associated with stored location information satisfying a prescribed rule with respect to the requested location information, from the storage unit if it is judged that no location information identical with the requested location information has been stored in the storage unit, acquires the content in accordance with the acquired parameters; and lays out the acquired content in accordance with the acquired parameters.

21. The terminal device according to claim 20, wherein the location information satisfying the prescribed rule is location information that is the most similar to the location information of the requested content in regard to both a domain name and a path name among all the location information stored in the storage unit.

22. The terminal device according to claim 21, wherein the browsing control unit operates to:
successively compare each element of the domain name of the location information of the requested content with each element of the domain name of each piece of location information stored in the storage unit starting from the rightmost element and sets a match number regarding the domain name at k−1 when a mismatch first occurs at the k-th element;
successively compare each element of the path name of the location information of the requested content with each element of the path name of the location information stored in the storage unit starting from the leftmost element and sets a total match number regarding the domain name and the path name at k+n−1 when a mismatch first occurs at the n-th element in cases where all the elements of the domain name of the location information of the requested content coincide with those of the domain name of the location information stored in the storage unit; and
apply location information stored in the storage unit and having the maximum match number regarding the domain name or the maximum total match number regarding the domain name and the path name as the location information satisfying the prescribed rule.

23. The terminal device according to claim 22, wherein the browsing control unit operates to apply one of multiple pieces of location information having "www" as the leftmost element of the domain name as the stored location information satisfying the prescribed rule when the multiple pieces of location information having the same total match number regarding the domain name have been stored in the storage unit and the multiple pieces of location information differ only in the leftmost element of the domain name.

24. The terminal device according to claim 22, further comprising a selecting unit which applies, as the stored location information satisfying the prescribed rule, one of multiple pieces of location information that is applied the latest or is applied the largest times regarding at least one selected from among information on a parameter update date/time, information on a parameter acquisition date/time and information on the number of times of parameter acquisition when multiple pieces of location information having the same match number regarding the domain name or having the same total match number regarding the domain name and the path name have been stored in the storage unit.

25. The terminal device according to claim 22, further comprising:
a setting unit that sets a condition of the application of the parameters to the process for the browsing of the requested content for each of the parameters associated with the location information satisfying the prescribed rule.

26. The terminal device according to claim 22, further comprising:
a setting unit that sets a condition of the application of the parameters to the process for the browsing of the requested content for each category of the parameters associated with the location information satisfying the prescribed rule.

27. The terminal device according to claim 20, further comprising a parameter setting unit which receives a user operation for changing a parameter through a user interface, wherein:
when a parameter is changed by the user operation, the changed parameter is stored in the storage unit while being associated with the stored location information of the currently displayed content.

28. The terminal device according to claim 27, further comprising a first parameter storing unit which stores the changed parameter in the storage unit while associating it with only one of the location information, upper-level location information and lower-level location information if data identical with the changed parameter has already been stored in the storage unit while being associated with the upper-level location information or the lower-level location information at the point when the changed parameter is stored in the storage unit while being associated with the stored location information.

29. The terminal device according to claim 27, further comprising a second parameter storing unit which cancels the storing of the changed parameter while just storing other changed parameters not stored in the storage unit yet if data identical with the changed parameter has already been stored in the storage unit while being associated with upper-level location information or lower-level location information of the location information at the point when the changed parameter is stored in the storage unit while being associated with the stored location information.

30. The terminal device according to claim 20, further comprising a first parameter applying unit which applies the parameter data that has been associated with upper-level location information of the stored location information corresponding to the requested content stored in the storage unit as a parameter of the requested content if the upper-level location information has been stored in the storage unit and the parameter data has been stored associated with the upper-level location information, in regard to the parameter whose value has not been set yet among the parameters associated with the stored location information corresponding to the requested content.

31. The terminal device according to claim 30, further comprising a second parameter applying unit which applies a default value of the parameter as the parameter of the requested content when the parameter has not been stored for any of the upper-level location information.

32. The terminal device according to claim 20, further comprising a deleting unit which selectively deletes parameters stored in the storage unit based on at least one selected from among information on a parameter update date/time, information on a parameter acquisition date/time and information on the number of times of parameter acquisition.

33. The terminal device according to claim 20, wherein:
a plurality of parameter sets, each of which includes a set of parameters to which parameter data has been preset, are stored in the storage unit, and
information indicating which of the parameter sets should be applied is stored in the storage unit while being associated with the content location information.

34. The terminal device according to claim 20, wherein the storage unit is installed in the terminal device.

35. The terminal device according to claim 20, wherein the storage unit is installed in a server on a network.

36. The terminal device according to claim 20, wherein the content is a Web page.

\* \* \* \* \*